(12) United States Patent
Cheng

(10) Patent No.: US 11,183,908 B2
(45) Date of Patent: Nov. 23, 2021

(54) METHOD FOR PRODUCING RADIALLY ANISOTROPIC MULTIPOLAR SOLID MAGNET ADAPTED TO DIFFERENT WAVEFORM WIDTHS

(71) Applicant: Shenzhen Radimag Magnets Co., Ltd, Shenzhen (CN)

(72) Inventor: Wenhao Cheng, Shenzhen (CN)

(73) Assignee: SHENZHEN RADIMAG MAGNETS CO., LTD, Shenzhen (CN)

( * ) Notice: Subject to any disclaimer, the term of this patent is extended or adjusted under 35 U.S.C. 154(b) by 0 days.

(21) Appl. No.: 16/888,016

(22) Filed: May 29, 2020

(65) Prior Publication Data

US 2020/0395829 A1    Dec. 17, 2020

(30) Foreign Application Priority Data

Jun. 11, 2019    (CN) .......................... 201910502356.8

(51) Int. Cl.
| | | |
|---|---|---|
| *H02K 15/03* | (2006.01) | |
| *H02K 1/27* | (2006.01) | |
| *H02K 1/30* | (2006.01) | |

(52) U.S. Cl.
CPC ........... *H02K 15/03* (2013.01); *H02K 1/2726* (2013.01); *H02K 1/30* (2013.01)

(58) Field of Classification Search
CPC ........ H02K 15/03; H02K 1/2726; H02K 1/30; H02K 1/2733; H02K 2213/03; H02K 1/02
USPC ........................................ 310/156.08, 156.12
See application file for complete search history.

(56) References Cited

U.S. PATENT DOCUMENTS

| | | | | |
|---|---|---|---|---|
| 4,600,555 A | * | 7/1986 | Shimizu | H01F 13/003 419/5 |
| 4,678,634 A | * | 7/1987 | Tawara | H01F 13/003 148/103 |
| 4,963,320 A | * | 10/1990 | Saito | B22F 3/02 148/101 |
| 5,788,782 A | * | 8/1998 | Kaneko | B22F 9/023 148/101 |
| 5,913,255 A | * | 6/1999 | Kikuchi | H01F 41/0253 75/244 |
| 7,201,809 B2 | * | 4/2007 | Sato | H01F 7/021 148/103 |

(Continued)

FOREIGN PATENT DOCUMENTS

| | | |
|---|---|---|
| CN | 1934663 A | 6/2005 |
| CN | 200947369 Y | 9/2007 |

(Continued)

*Primary Examiner* — John K Kim
(74) *Attorney, Agent, or Firm* — Dragon Sun Law Firm, PC; Jinggao Li, Esq.

(57) ABSTRACT

A method and device for producing a radially anisotropic multipolar solid magnet adapted to different waveform widths are provided. A mold core is removed from a mold for molding the magnet, and outer oriented poles, the number of which is the same as that of poles of the radially anisotropic multipolar solid cylindrical magnet, are arranged outside the mold. The width of a front end of a single outer oriented pole is determined according to the desired width of a single waveform of the radially anisotropic multipolar solid cylindrical magnet after being magnetized. The sum L of widths or arc lengths of front ends of all the outer oriented poles is less than $0.9\pi D$, particularly less than $0.7\pi D$, where D is the outer diameter of a mold sleeve. Magnetic particles in a mold cavity are rotated with the mold only during magnetization.

15 Claims, 4 Drawing Sheets

(56) References Cited

U.S. PATENT DOCUMENTS

| | | | | |
|---|---|---|---|---|
| 2007/0171017 | A1* | 7/2007 | Sato | H02K 15/03 335/296 |
| 2010/0019587 | A1* | 1/2010 | Sato | H01F 41/0266 310/44 |
| 2011/0266894 | A1* | 11/2011 | Yamashita | B32B 37/02 310/49.53 |
| 2013/0069747 | A1* | 3/2013 | Honkura | B29C 43/003 335/302 |
| 2015/0236554 | A1* | 8/2015 | Baud | H02K 1/278 310/154.03 |
| 2017/0221631 | A1* | 8/2017 | Honkura | B29C 43/003 |
| 2017/0330658 | A1* | 11/2017 | Namkung | C22C 23/06 |
| 2020/0395829 | A1* | 12/2020 | Cheng | H02K 15/03 |

FOREIGN PATENT DOCUMENTS

| | | |
|---|---|---|
| CN | 101162646 A | 4/2008 |
| CN | 101552032 A | 12/2008 |
| CN | 102272070 A | 12/2009 |
| CN | 201807736 U | 8/2010 |
| CN | 102456463 A | 10/2010 |
| CN | 103262182 A | 8/2012 |
| CN | 104715916 A | 12/2013 |
| CN | 104124051 A | 7/2014 |
| CN | 104269265 A | 10/2014 |
| CN | 104347261 A | 10/2014 |
| CN | 104505205 A | 11/2014 |
| CN | 104493158 A | 12/2014 |
| CN | 104347261 A | 2/2015 |
| CN | 105895359 A | 6/2016 |
| CN | 106252023 A | 8/2016 |
| CN | 108063037 A | 11/2016 |
| CN | 106653267 A | 12/2016 |
| CN | 108922764 A | 6/2018 |
| CN | 108963068 A | 7/2018 |
| JP | H08111337 A | 10/1994 |
| JP | H0978104 A | 9/1995 |
| JP | 08111337 A | 4/1996 |
| WO | 2018088393 A1 | 10/2019 |

* cited by examiner

METHOD FOR PRODUCING RADIALLY ANISOTROPIC MULTIPOLAR SOLID MAGNET ADAPTED TO DIFFERENT WAVEFORM WIDTHS

CROSS-REFERENCE TO RELATED APPLICATION

The present application claims priority to Chinese Patent Application No. 201910502356.8 filed to the CNIPA on Jun. 11, 2019 and entitled METHOD FOR PRODUCING RADIALLY ANISOTROPIC MULTIPOLAR SOLID MAGNET ADAPTED TO DIFFERENT WAVEFORM WIDTHS, the disclosure of which is hereby incorporated by reference in its entirety.

TECHNICAL FIELD

The present disclosure belongs to the field of permanent magnetic materials, and relates to a method and device for producing a radially anisotropic multipolar solid magnet adapted to different waveform widths.

BACKGROUND OF THE PRESENT DISCLOSURE

As a kind of indispensable functional materials, permanent magnetic materials play a very important role in the field of small- and medium-sized motors, particularly micromotors. Miniaturization and microminiaturization are the current development trends in industries such as automatic devices, intelligent devices and robots.

Miniature devices require micro-motors, and miniature magnetic components (e.g., permanent magnetic rotors) are required during the production of micro-motors. Radially-oriented magnet rings (referred to as radial rings) and radially-oriented multipolar magnet rings (referred to as multipolar rings) are two kinds of permanent magnets commonly used during the production of high-precision micromotors. In existing processes for producing radial magnet rings and multipolar magnet rings, for example the inventor's earlier applications CN200710106670.1, CN200810066269.4 or the like, a mold mold core, which is magnetic conducting and made of a ferromagnetic material, must be arranged in the center of a mold (or a model), so that radially anisotropic multipolar magnet rings can be produced. The radially anisotropic cylindrical magnet described in the representative Patent CN1420504 by Shin Etsu is manufactured by a mold with a mold core, and is also a magnet ring.

As automation and intellectualization become development trends, there are high demands for permanent magnetic motors with small size, light weight, high precision and energy-saving in the market. The main way to realize high precision of motors is the use of radially anisotropic magnets in permanent magnetic motors. However, the manufacturing of radially anisotropic multipolar magnets with a very small inner diameter or diameter (e.g., less than 3 mm or even less) has always been a challenge in the industry.

In permanent magnetic motors, the waveform of permanent magnetic rotors plays a very important or even decisive role in many characteristics of the motors. Motors with certain parameters require that the waveform of the magnetic field provided by the permanent magnetic rotor is as wide as possible to satisfy the design requirements, while motors with other certain parameters require that the waveform of the magnetic field provided by the permanent magnetic rotor is narrow and sharp to satisfy the design requirements. It is very difficult to produce radially anisotropic multipolar magnets with an inner diameter less than 3 mm, and it is more difficult to produce miniature radially anisotropic multipolar magnets satisfying these requirements.

Therefore, a heretofore unaddressed need exists in the art to address the aforementioned deficiencies and inadequacies.

SUMMARY OF THE PRESENT DISCLOSURE

In view of the difficulties in the manufacturing of radially anisotropic multipolar magnets smaller than 3 mm or even less and radially anisotropic multipolar magnets in which permanent magnetic rotors provide magnetic fields with different waveform widths in the prior art, the present disclosure provides a method and device for producing a radially anisotropic multipolar solid cylindrical magnet adapted to different waveform widths. The produced radially anisotropic multipolar solid cylindrical magnet can be directly used as a micro-motor rotor to satisfy the demands of high-precision micro-motors for radially anisotropic multipolar magnets with an inner diameter or diameter less than 3 mm or even less, or can be mounted, as a component for providing a permanent magnetic field, on a motor shaft made from other metal materials by forming a hole with a desired inner diameter (an arbitrarily small inner diameter) in the center of the magnet. More importantly, radially anisotropic multipolar solid cylindrical magnets adapted to different waveform widths can be produced by adjusting the width of front ends of outer oriented poles, so that the demands of motors having different parameters for the waveforms of magnetic fields of permanent magnetic rotors are satisfied.

In the method provided by the present disclosure, the "mold core" as described in CN 200710106670.1, CN 200810066269.4, CN1420504 or the like is removed; oriented magnet poles, the number of which is the same as that of poles of the radially anisotropic multipolar solid cylindrical magnet, are arranged outside a mold; and, the width of the waveform of the radially anisotropic multipolar solid cylindrical magnet after being magnetized is adjusted by adjusting the sum L of widths or arc lengths of front ends of the outer oriented poles arranged outside the mold. When the sum L of widths or arc lengths of the front ends of all the outer oriented poles is less than 0.9πD, particularly less than 0.7πD, where D is the outer diameter of a mold sleeve, magnetic particles in a mold cavity are rotated with the mold during magnetization, i.e., during the application of a first magnetic field.

If the pole width of the radially anisotropic multipolar solid cylindrical magnet after being magnetized is designed to be small, the sum L of widths or arc lengths of the front ends of all the outer oriented poles arranged outside the mold will be less than 0.9πD or even less than 0.7πD (where D is the outer diameter of the mold sleeve) or even less. In this case, during the application of the first magnetic field to the magnetic particles in the mold cavity, since part of magnetic particles are not located in a high-intensity region of the magnetizing magnetic field, so that these magnetic particles cannot be magnetized fully. Accordingly, these magnetic particles cannot be aligned completely along the oriented magnetic field during the molding process, and the magnetic performance of the produced radially anisotropic multipolar solid cylindrical magnet will be reduced, so that the magnetic performance of the magnet cannot satisfy the design requirements of motors. Therefore, in the present disclosure, the sum L of widths or arc lengths of the front ends of the outer oriented poles is defined to be less than 0.9πD, particularly less than 0.7πD.

The molding method provided by the present disclosure includes following steps of:
(1) preparing a mold without a mold core;
(2) arranging, around the prepared mold, outer oriented poles, the number of which is the same as that of poles of the radially anisotropic multipolar solid cylindrical magnet, the sum L of widths or arc lengths of front ends of all the outer oriented poles being less than 0.9πD, particularly less than 0.7πD, where D is the outer diameter of a mold sleeve;
(3) filling anisotropic magnetic particles in a mold cavity;
(4) applying a first magnetic field to continuously rotate the mold and the magnetic particles in the mold cavity;
(5) stopping the rotation of the mold and the magnetic particles, applying a second magnetic field, applying an increased stress to the magnetic particles in the mold cavity by an upper ram and a lower ram, and maintaining this stress for a certain period of time to obtain a blank; or, by keeping the lower ram unmoved, moving the upper ram down to apply an increased stress to the magnetic particles in the mold cavity and maintaining this stress for a certain period of time; or, by keeping the upper ram unmoved, moving the lower ram up to apply an increased stress to the magnetic particles in the mold cavity and maintaining this stress for a certain period of time, the stress being preferably 20 MPa to 200 MPa, preferably 50 MPa to 150 MPa;
(6) in the step (5), when the magnetic particles in the mold cavity cannot recover to an out-of-order state before orientation after leaving the oriented magnetic field, applying a third magnetic field, and continuously applying a stress by the rams until the blank has a desired density;
(7) applying a fourth magnetic field to demagnetize the blank; and preferably, applying a reverse magnetic field to the blank in the mold cavity to demagnetize the blank, or applying a forward/reverse alternating magnetic field to demagnetize the blank in the mold cavity; and
(8) stopping the application of stress, and demolding to obtain the blank.

Wherein:

In the step (4), a magnetic field generation device firstly applies a first magnetic field to fully magnetize the magnetic particles in the mold cavity. The higher the intensity of the magnetic field is, the higher the degree of magnetization of the magnetic particles is, and the more beneficial the subsequent rotated orientation is.

In the step (5), the second magnetic field is applied to arrange the easy directions of magnetization of the magnetic particles in the mold cavity along the oriented magnetic field. The arc magnetic field formed around the poles will be higher in intensity when the intensity of the magnetic field is higher, which affects the alignment of the magnetic particles along the oriented magnetic field, the intensity of the second magnetic field should be lower than that of the first magnetic field, that is, the intensity of the first magnetic field is 1.5 to 3 times of that of the second magnetic field.

In the step (5), during the application of the second magnetic field, a gradually increased stress is applied to the magnetic particles until the stress is increased to a certain level at which the magnetic particles in the mold cavity are aligned along the oriented magnetic field.

In the step (6), when the magnetic particles cannot recover to an out-of-order state before orientation after leaving the oriented magnetic field, a third magnetic field is applied. In this stage, the anisotropic magnetic particles in the mold cavity have been aligned along the oriented magnetic field. Therefore, to save energy and to facilitate the application of a fourth magnetic field to the blank, the intensity of the third magnetic field is 1 to 0 times of that of the second magnetic field. The stress is continuously applied by the rams until the blank in the mold has a desired density.

In the step (7), the magnetic field generation device applies a fourth magnetic field to demagnetize the blank. Preferably, the fourth magnetic field is a reverse magnetic field having an intensity that is 0.5 to 0.01 times of that of the second magnetic field or a forward/reverse alternating magnetic field.

In the step (8), the application of stress is stopped, and demolding is performed to obtain the blank of the radially anisotropic multipolar solid cylindrical magnet adapted to different waveform widths.

The mold includes a mold cavity, an upper ram and a lower ram, without a mold core. The oriented magnetic field generation device includes outer oriented poles, the number of which is the same as that of poles of the radially anisotropic multipolar solid cylindrical magnet and which are arranged outside the mold, wherein the sum L of widths or arc lengths of front ends of all the outer oriented poles is less than 0.9πD, particularly less than 0.7πD, where D is the outer diameter of the mold sleeve. A rotating device is further provided so that the mold and the magnetic particles in the mold cavity are rotated continuously during magnetization.

The present disclosure further provides a method for manufacturing a radially anisotropic multipolar solid cylindrical sintered magnet adapted to different waveform widths, including steps of:
(1) molding a blank by the method provided by the present disclosure;
(2) sintering and aging, preferably including specific steps of:
(i) vacuumizing in advance;
(ii) heating, while vacuumizing, to a sintering temperature of 1000° C. to 1150° C.;
(iii) sintering in vacuum and maintaining the temperature;
(iv) feeding an inert gas and cooling; and
(v) aging at 400° C. to 600° C., or aging at about 850° C. to 950° C. and then aging at 400° C. to 600° C.

Or, a method for manufacturing a radially anisotropic multipolar solid cylindrical bonded magnet adapted to different waveform widths is provided, including steps of:
(1) molding a blank by the method provided by the present disclosure; and
(2) heat treating to solidify an adhesive in the bonded magnet.

Additionally, the present further provides a device using the molding method described above, including a mold, a magnetic field generation device, a rotating mechanism and a stress applying device, wherein:

the mold includes a mold sleeve, a mold cavity, an upper ram and a lower ram, without a mold core;

the magnetic field generation device includes outer oriented poles, the number of which is the same as that of poles of a radially anisotropic multipolar solid cylindrical magnet and which are arranged around the mold, wherein the width of the front end of a single outer oriented pole is determined according to the desired width of a single waveform of the radially anisotropic multipolar solid cylindrical magnet after being magnetized; the sum L of widths or arc lengths of front ends of all the outer oriented poles is less than 0.9πD, preferably less than or equal to $0.7\pi D$, where D is the outer diameter of the mold sleeve; and the orientated magnetic field is symmetrically arranged at equal intervals around the magnet within 360°;

and the rotating mechanism enables anisotropic magnetic particles in the mold cavity to continuously rotate with the mold only during magnetization, i.e., during the application of a first magnetic field.

In the present disclosure, the oriented magnetic field may be an electromagnetic field, a permanent magnetic field, or a mixed magnetic field formed by the both.

The present disclosure has the following remarkable technical effects.

(1) The present disclosure solves the difficulties in large-scale production of radially anisotropic multipolar magnets with an inner diameter or diameter less than 3 mm or even less, and also the difficulties in the manufacturing of radially anisotropic multipolar magnets adapted to different waveform widths in the prior art. The produced radially anisotropic multipolar solid cylindrical magnets can be directly used as a micro-motor rotor to satisfy the demand of high-precision micro-motors for radially anisotropic multipolar magnets with an inner diameter or diameter less than 3 mm or even less, or can be mounted, as a component for providing a permanent magnetic field, on a motor shaft made from other metal materials by forming a hole with a desired inner diameter (an arbitrarily small inner diameter) in the center of the magnet. More importantly, the width of the waveform of the radially anisotropic multipolar solid cylindrical magnet after being magnetized is adjusted by adjusting the sum of widths or arc lengths of front ends of outer oriented poles arranged outside the mold, so that the demands of motors having different parameters for the waveforms of magnetic fields of permanent magnetic rotors are satisfied.

(2) The mold core necessary for the mold during the production of cylindrical magnets in the prior art is removed; the sum L of widths or arc lengths of the front ends of the outer oriented poles is less than $0.9\pi D$, particularly $0.7\pi D$, where D is the outer diameter of the mold sleeve; and the mold is rotated with the magnetic particles in the mold cavity only during magnetization.

(3) The present disclosure solves the difficulties in large-scale production of radially anisotropic multipolar magnets with an inner diameter or diameter less than 3 mm or even less and radially anisotropic multipolar magnets adapted to different waveform widths in the prior art. This method is highly controllable during mass production. The prepared multipolar magnet has complete orientation and highly uniform oriented poles. The magnetic energy product of the magnet is increased by 3 MGOe to 8 MGOe. The surface magnetic flux of the magnetized poles is increased by 5% to 10%, or even above 15% for magnets with a certain diameter.

(4) During the molding process, by applying an oriented magnetic field that changes by stages, on one hand, the alignment of the easy directions of magnetization of the magnetic particles along the oriented magnetic field is ensured, and it is very advantageous to achieve better magnetic performance; and on the other hand, the electromagnetic energy is saved, and the cost for mass production of magnets is reduced, leading to a promising industrial application prospect.

(5) The method provided by the present disclosure is high in applicability, and suitable for preparing anisotropic sintered magnets in low cost and also suitable for preparing bonded magnets, particularly suitable for molding magnets such as neodymium iron boron and ferrite, without any limitations to the type of the used magnetic particles.

BRIEF DESCRIPTION OF THE DRAWINGS

The accompanying drawings illustrate one or more embodiments of the present disclosure and, together with the written description, serve to explain the principles of the invention. Wherever possible, the same reference numbers are used throughout the drawings to refer to the same or like elements of an embodiment.

Figure 1:
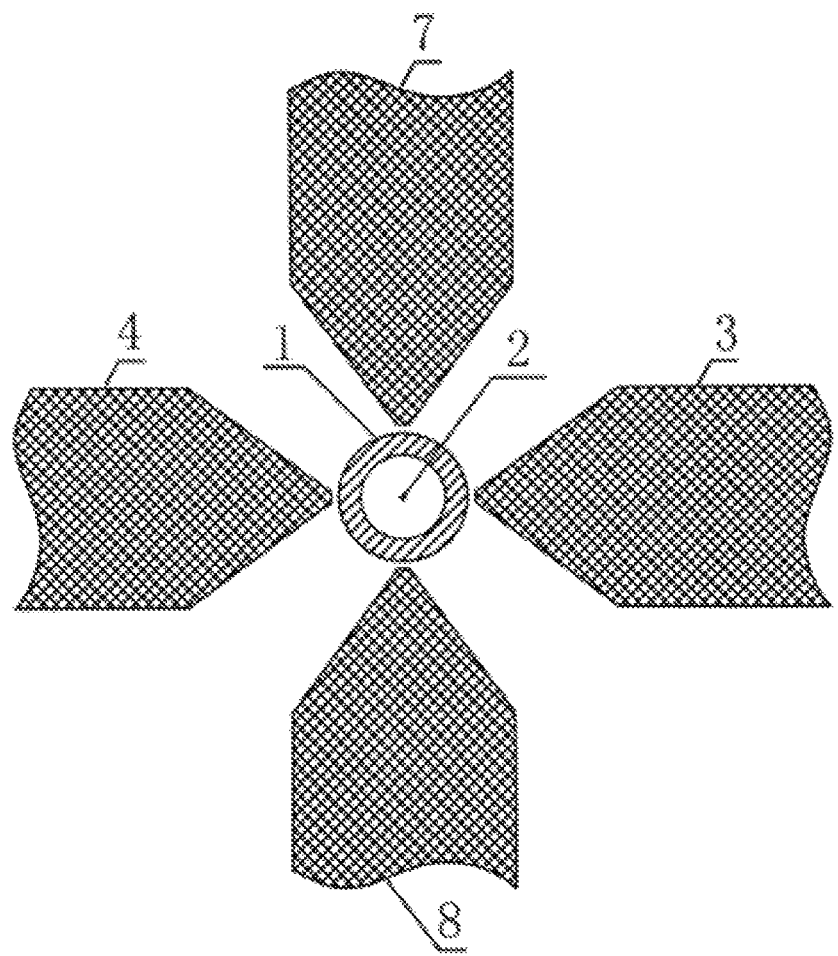
FIG. 1 is a schematic view of preparation of a radially anisotropic solid cylindrical four-polar magnet according to the present disclosure (L<$0.7\pi D$)

in which: 1: mold sleeve; 2: mold cavity; 3, 4, 7 and 8: magnetic poles; 5: upper ram; and, 6: lower ram.

DETAILED DESCRIPTION OF THE PRESENT DISCLOSURE

The present disclosure will now be described more fully hereinafter with reference to the accompanying drawings, in which exemplary embodiments of the present disclosure are shown. The present disclosure may, however, be embodied in many different forms and should not be construed as limited to the embodiments set forth herein. Rather, these embodiments are provided so that this disclosure is thorough and complete, and will fully convey the scope of the disclosure to those skilled in the art. Like reference numerals refer to like elements throughout.

The present disclosure will be further described below in detail by specific implementations, and the protection scope of the present disclosure is not limited thereto.

Embodiment 1

A method for manufacturing a radially anisotropic solid cylindrical four-polar sintered magnet adapted to different waveform widths is provided, including the following steps.

(1) RFeB typed magnetic particles to be molded are prepared. The magnetic particles include the following specific components (wt %): 29% to 31% of rare-earth Pr+Nd, 0.5% to 5.0% of one or more of Dy, Tb, Ho and Tb, 0.5% to 3% of Co, 0.95% to 1.15% of B, 0.5% to 2% of Nb+Zr, 1.0% or less of Cu, 1.0% or less of Al, and the remaining of Fe and inevitable impurities.

(2) The magnetic particles are melted and cast in a vacuum furnace to obtain an ingot or a rapidly-quenched ribbon.

(3) The ingot is crushed or the rapidly-quenched ribbon is treated by conventional pulverizing methods such as coarse crushing and jet milling to obtain micron-sized magnetic particles. Preferably, the magnetic particles have an average particle size of less than 5.5 μm, preferably about 3.5 μm.

(4) According to the desired shape and size of the magnet to be molded, a corresponding solid cylindrical magnet mold is designed and prepared (as shown in FIG. 1). The mold is made from a non-ferromagnetic material, ensuring that the magnetic field can go through the mold cavity from one side to the other side. The mold includes a mold sleeve 1, a mold cavity 2, an upper ram 5 and a lower ram 6, without a mold core.

(5) The prepared molding mold is mounted in the magnetic field generation device. Poles 3, 4, 7 and 8 of the radially anisotropic multipolar solid cylindrical magnet are arranged around the mold at equal intervals. The sum L of widths or arc lengths of front ends of all the outer oriented poles is less than 0.9πD, preferably less than or equal to 0.7πD, where D is the outer diameter of the mold sleeve.

(6) The magnetic particles prepared in the step (3) are filled in the mold cavity, and the upper ram 5 of the mold is moved to a position in the mold cavity at the same height as upper edge of the poles for the oriented magnetic field or a position slightly lower than the upper edge of the poles for the oriented magnetic field. Accordingly, it is ensured that the magnetic particles will not flow out of the mold cavity during the rotation of the mold and/or the magnetization by the magnetic field, and it is also ensured that the magnetic particles in the mold cavity have enough space to continuously rotate in the magnetic field, so that non-uniform magnetic performance resulted from the non-uniformity of the oriented magnetic field can be solved by the continuous rotation of the magnetic particles.

(7) The magnetic field generation device is activated to generate an oriented magnetic field having an intensity of 3 KGs to 15 KGs, to fully magnetize the magnetic particles in the mold cavity. During magnetization, the mold is continuously rotated with the magnetic particles in the mold cavity.

(8) The rotation of the mold and the magnetic particles is stopped, and a second magnetic field is applied. The intensity of this magnetic field is lower than that of the first magnetic field used during magnetization, and is 2 KGs to 10 KGs. A gradually increased stress is applied to the magnetic particles in the mold cavity by both the upper and lower rams 5, 6 until the stress reaches 20 MPa to 200 MPa, preferably 50 MPa to 120 MPa, and this stress is maintained for a certain period of time. The stress maintaining duration is determined according to the desired density of the blank, and is preferably 2 min to 2 h. Or, the lower ram is kept unmoved and the upper ram is moved down to apply an increased stress to the magnetic particles in the mold cavity, and this stress is maintained for a certain period of time. When the stress is increased to a level at which the stress is to be maintained, the frictional force $f_{resistance}$ between the anisotropic magnetic particles in the mold cavity is greater than the recovery force $f_{recovery}$ required for the recovery of the easy directions of magnetization of the magnetic particles from an in-order state to an out-of-order state but less than the orientation force $f_{orientation}$ to the anisotropic magnetic particles by the approximately two-dimensional magnetic field. At this time, 100% (by volume) of the magnetic particles in the mold cavity are radially anisotropic. When the magnetic particles cannot recover to the out-of-order state before orientation after leaving the oriented magnetic field, a third magnetic field having an intensity of 1 KGs to 5 KGs is applied. In this stage, the anisotropic magnetic particles in the mold cavity have been radially aligned along the oriented magnetic field.

(9) A stress is continuously applied by the rams until the blank in the mold has a desired density, and a fourth magnetic field having an intensity of 5 KGs to 0.01 KGs (preferably 1 KGs to 0.01 KGs) is applied to demagnetize the molded blank. The fourth magnetic field is a reverse magnetic field or a forward/reverse alternating magnetic field.

(10) The application of the stress is stopped, and demolding is performed to obtain a molded solid cylindrical blank.

(11) The molded magnet blank is sintered and aged, specifically including steps of:
(i) vacuumizing, in advance, a sintering furnace to below $10^{-2}$ Pa;
(ii) heating, while vacuumizing, to a sintering temperature of 1000° C. to 1120° C.;
(iii) sintering in vacuum and maintaining the temperature for 30 min to 3 h;
(iv) feeding an inert gas (e.g., nitrogen) and cooling; and
(v) aging at 400° C. to 600° C. for 0.5 h to 2 h, or aging at about 850° C. to 950° C. for 0.5 h to 1 h and then aging at 400° C. to 600° C. for 0.5 h to 1 h, to obtain a radially anisotropic solid cylindrical four-polar magnet.

The VSM test shows that the magnetic energy product of the magnet prepared in this embodiment is generally increased by 3 MGOe to 8 MGOe in comparison to the magnet prepared by using the same steps and parameters but not rotating the magnetic particles during magnetization.

Figure 4:
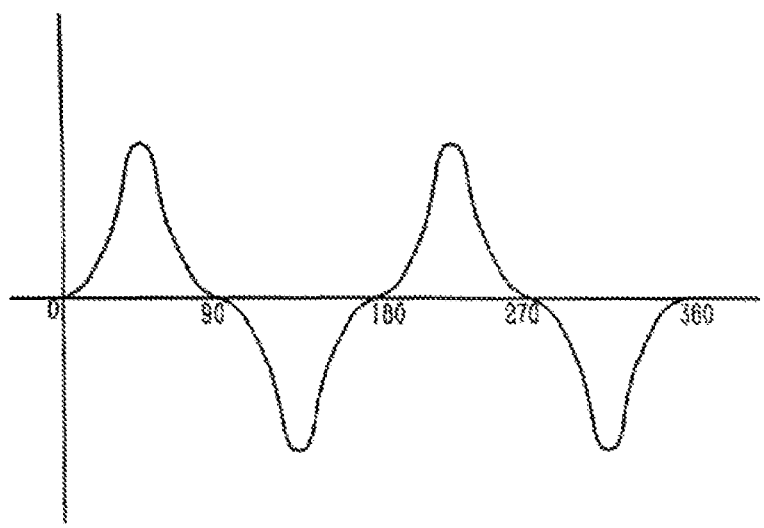
FIG. 4 shows a magnetization waveform of the radially anisotropic solid cylindrical four-polar magnet prepared by a method according to the present disclosure (L<$0.7\pi D$)

FIG. 4 shows a magnetization waveform of four poles of the radially anisotropic solid cylindrical magnet produced in this embodiment. The surface magnetic flux of the magnetized poles is generally increased by 5% to 10%, or even above 15% for magnets with a certain diameter, with excellent magnetic performance.

Embodiment 2

Figure 2:
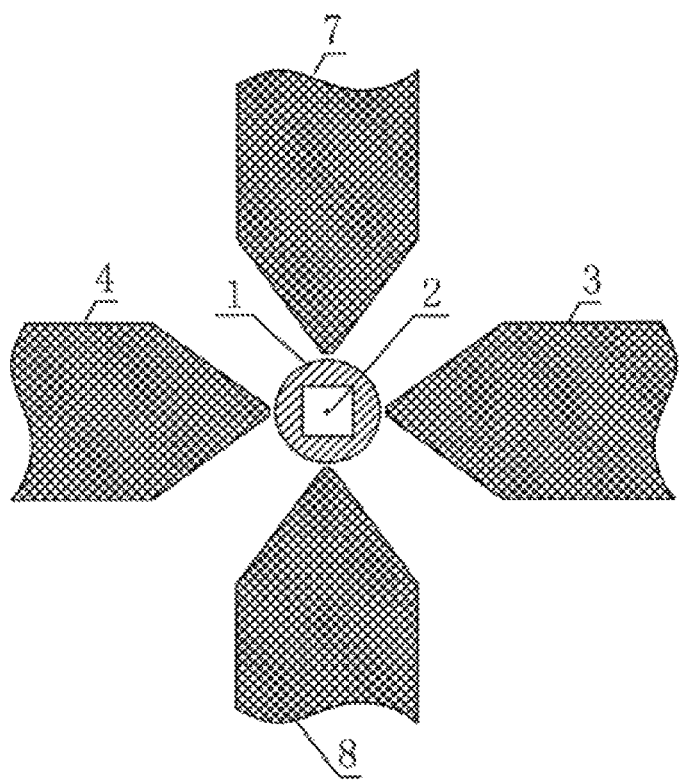
FIG. 2 is a schematic view of preparation of a radially anisotropic multipolar solid polyhedral magnet according to the present disclosure.
Figure 3:
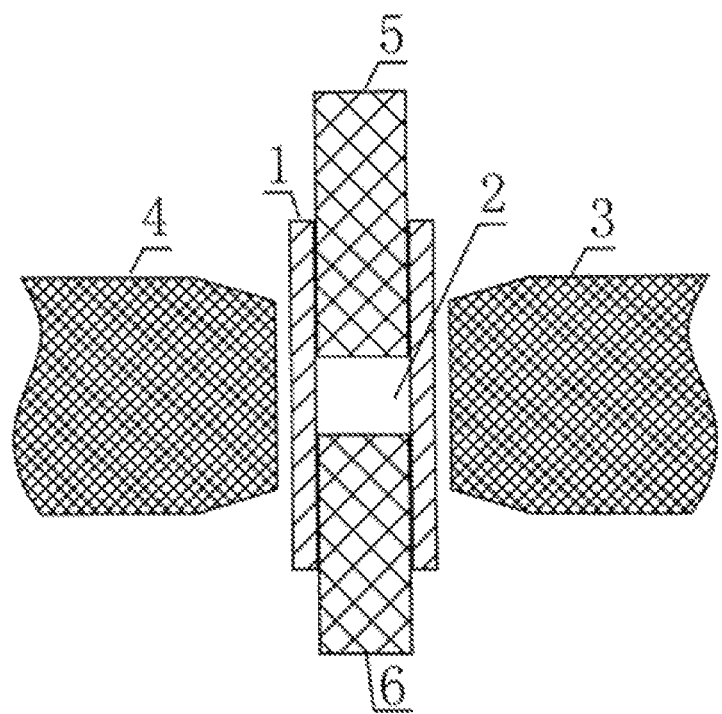
FIG. 3 is a sectional view of preparation of a radially anisotropic multipolar solid cylindrical magnet according to the present disclosure.

A radially anisotropic solid tetrahedral sintered magnet is manufactured by a process the same as that in Embodiment 1. This embodiment differs from Embodiment 1 in that a corresponding tetrahedral mold, without a mold core, is designed and prepared according to the desired size of the solid tetrahedral magnet to be molded in the step (4) (as shown in FIG. 2). By the steps (1) to (11), a radially anisotropic solid tetrahedral sintered magnet with excellent magnetic performance is obtained, with the surface magnetic flux of the magnetized poles being increased by above 8%.

Embodiment 3

A radially anisotropic solid cylindrical bonded magnet is manufactured by a process the same as that in Embodiment 1. This embodiment differs from Embodiment 1 in that an adhesive is added in advance to the magnetic particles obtained in the step (6), and conventional heat treatment is performed in the step (11) to solidify the adhesive in the bonded magnet. In this way, a radially anisotropic solid cylindrical bonded magnet with excellent magnetic performance is obtained, with the surface magnetic flux of the magnetized poles being increased by above 6%.

It is to be particularly noted that the present disclosure can also produce radially anisotropic oriented cylindrical or polyhedral magnets such as samarium cobalt, ferrite and bonded neodymium iron boron by changing the type of anisotropic magnetic particles in the mold cavity.

The forgoing embodiments merely show preferred implementations of the present disclosure, and should not be interpreted as limiting the protection scope of the present disclosure. It is to be noted that various alterations, replacements and improvements may be made by a person of ordinary skill in the art without departing from the concept of the present disclosure, and these alterations, replacements and improvements shall fall into the protection scope of the present disclosure.

What is claimed is:

1. A method for molding a radially anisotropic multipolar solid cylindrical magnet adapted to waveforms of different widths, comprising following steps of:
   (1) preparing magnetic particles;
   (2) melting the magnetic particles and casting the magnetic particles in a vacuum furnace to obtain an ingot or a rapidly quenched ribbon;
   (3) crushing the ingot or treating the ribbon with a pulverizing method to obtain micron-sized magnetic particles;
   (4) preparing a cylindrical mold with a mold cavity;
   (5) mounting the mold in a magnetic field generation device and arranging, outside the prepared mold, outer oriented poles, the number of which is the same as that of poles of the radially anisotropic multipolar solid cylindrical magnet, wherein the width of a front end of a single outer oriented pole is determined according to the desired width of a single waveform of the radially anisotropic multipolar solid cylindrical magnet after being magnetized, the radial anisotropy is adjusted by adjusting the sum of widths or arc lengths of front ends of outer oriented poles arranged outside the mold, wherein the sum L of widths or arc lengths of front ends of all the outer oriented poles is less than $0.9\pi D$, where D is an outer diameter of a mold sleeve;
   (6) filling the micron-sized magnetic particles in the mold cavity;
   (7) applying a first magnetic field and continuously rotating the mold and the magnetic particles in the mold cavity;
   (8) stopping the rotation of the mold and the micron-sized magnetic particles, applying a second magnetic field, wherein an intensity of the second magnetic field is lower than an intensity of the first magnetic field, the intensity of the first magnetic field being 1.5 to 3 times the intensity of the second magnetic field, applying an increased stress to the micron-sized magnetic particles in the mold cavity by an upper ram and a lower ram, and maintaining this stress for a certain period of time to obtain a blank; or, by keeping the lower ram unmoved, moving the upper ram down to apply an increased stress to the micron-sized magnetic particles in the mold cavity and maintaining this stress for a certain period of time; or, by keeping the upper ram unmoved, moving the lower ram up to apply an increased stress to the micron-sized magnetic particles in the mold cavity and maintaining this stress for a certain period of time;
   (9) when the micron-sized magnetic particles in the mold cavity cannot recover to an out-of-order state before orientation after leaving the oriented magnetic field, applying a third magnetic field wherein an intensity of the third magnetic field is 1 to 0.1 times the intensity of the second magnetic field, and continuously applying a stress by the rams until the blank has a desired density;
   (10) applying a fourth magnetic field to demagnetize the blank, wherein an intensity of the fourth magnetic field is 0.5 to 0.01 times the intensity of the second magnetic field;
   (11) stopping the application of stress, and demolding to obtain the blank; and
   (12) sintering and aging the blank to obtain the magnet.

2. The method according to claim 1, wherein the sum L of widths or arc lengths of front ends of all the outer oriented poles is less than $0.7\pi D$, where D is the outer diameter of a mold sleeve.

3. The method according to claim 1, wherein the stress in the step (8) is 20 MPa to 200 MPa.

4. The method according to claim 3, wherein the stress in the step (8) is 50 MPa to 150 MPa.

5. The method according to claim 1, wherein, in the step (10), an alternating magnetic field is applied to demagnetize the blank in the mold cavity, wherein the alternating magnetic field alternates between a forward magnetic field and a reverse magnetic field.

6. The application in permanent magnetic motor rotors according to claim 1, wherein the magnet is configured to be used as a rotor of a high-precision micro-motor wherein the rotor has an inner diameter less than 3 mm.

7. The application in permanent magnetic motor rotors according to claim 1, wherein the magnet is configured to be used as a rotor of a high-precision micro-motor wherein the rotor has a diameter less than 3 mm.

8. The application in permanent magnetic motor rotors according to claim 1, wherein the magnet is mounted, as a component for providing a permanent magnetic field, on a motor shaft by forming a hole with a desired inner diameter in the center of the magnet.

9. A molding device using the method according to claim 1, comprising a mold, a magnetic field generation device, a rotating mechanism and a stress applying device by rams; the mold comprises a mold sleeve, a mold cavity, an upper ram and a lower ram; the magnetic field generation device comprises outer oriented poles, the number of which is the same as that of poles of a radially anisotropic multipolar solid cylindrical magnet and which are arranged outside the mold, wherein the width or arc length of the front end of a single outer oriented pole is determined according to the desired width of a single waveform of the radially anisotropic multipolar solid cylindrical magnet after being magnetized; the radial anisotropy is adjusted by adjusting the sum of widths or arc lengths of front ends of outer oriented poles arranged outside the mold, wherein the sum L of widths or arc lengths of front ends of all the outer oriented poles is less than $0.9\pi D$, where D is an outer diameter of a mold sleeve, and the outer orientated poles are symmetrically arranged at equal intervals around the magnet within 360'; and the rotating mechanism enables anisotropic magnetic particles in the mold cavity to continuously rotate with the mold only during magnetization.

10. The molding device according to claim 9, wherein the sum L of widths or arc lengths of front ends of all the outer oriented poles is less than $0.7\pi D$.

11. The method according to claim 1, wherein the magnetic particles comprise, by weight percentage: 29% to 31% of rare-earth Praseodymium+Neodymium (Pr+Nd), 0.5% to 5.0% of one or more of Dysprosium (Dy), Terbium (Tb), Holmium (Ho), 0.5% to 3% of Cobalt (Co), 0.95% to 1.15% of Boron (B), 0.5% to 2% of Niobium+Zirconium (Nb+Zr), 1.0% or less of Copper (Cu), 1.0% or less of Aluminum (Al), and the remaining of Iron (Fe) and impurities.

12. The method according to claim 11, wherein the step (12) comprises:
   (i) vacuumizing, in advance, a sintering furnace to below $10^{-2}$ Pa;
   (ii) heating the molded blank, while vacuumizing, to a sintering temperature of 1000° C. to 1120° C.;

(iii) sintering the molded blank in a vacuum and maintaining the sintering temperature for between 30 minutes to 3 hours;

(iv) feeding an inert gas and cooling; and (v) aging the molded blank at 400° C. to 600° C. for between 0.5 hours to 2 hours, or aging at 840° C. to 950° C. for between 0.5 hours to 1 hour and then aging at 400° C. to 600° C. for 0.5 hours to 1 hour to obtain the magnet.

13. The method according to claim 12, wherein in the step (8), four outer oriented poles are arranged outside of the prepared mold and the number of poles of the radially anisotropic multipolar solid cylindrical magnet is four.

14. The method according to claim 13, wherein the intensity of the first magnetic field is 3 KGs to 15 KGs, the intensity of the second magnetic field is 2 KGs to 10 KGs, the intensity of the third magnetic field is 1 KG to 5 KGs, and the intensity of the fourth magnetic field is 5 KGs to 0.01 KGs.

15. The method according to claim 14, wherein the intensity of the fourth magnetic field is 1 KG to 0.01 KGs.

* * * * *